United States Patent
She

(10) Patent No.: US 8,869,965 B2
(45) Date of Patent: Oct. 28, 2014

(54) ROLLER AND CONVEYING DEVICE WITH THE SAME

(71) Applicant: Shenzhen China Star Optoelectronics Technology Co., Ltd., Guangdong (CN)

(72) Inventor: Feng She, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/809,412

(22) PCT Filed: Oct. 11, 2012

(86) PCT No.: PCT/CN2012/082759
§ 371 (c)(1),
(2), (4) Date: Jan. 10, 2013

(87) PCT Pub. No.: WO2014/047972
PCT Pub. Date: Apr. 3, 2014

(65) Prior Publication Data
US 2014/0083823 A1   Mar. 27, 2014

(30) Foreign Application Priority Data
Sep. 25, 2012 (CN) .................. 2012 2 0493295 U

(51) Int. Cl.
*B65G 39/07* (2006.01)
*B65G 15/60* (2006.01)

(52) U.S. Cl.
CPC ................................ *B65G 15/60* (2013.01)
USPC ........................... 193/37; 198/780; 492/4

(58) Field of Classification Search
USPC .......... 193/37; 198/781, 782, 788, 780; 492/4
See application file for complete search history.

(56) References Cited

U.S. PATENT DOCUMENTS

| 2,007,910 | A | * | 7/1935 | Stephens | 198/813 |
| 2,984,335 | A | * | 5/1961 | Rhodes | 198/547 |
| 3,161,285 | A | * | 12/1964 | Hummer et al. | 198/498 |
| 4,392,568 | A | * | 7/1983 | Turnbough et al. | 198/781.06 |
| 4,523,674 | A | * | 6/1985 | Haugen et al. | 198/843 |
| 5,802,975 | A | * | 9/1998 | Prem et al. | 101/375 |
| 6,117,235 | A | * | 9/2000 | Toccaceli et al. | 118/118 |
| 6,360,662 | B1 | * | 3/2002 | Busshoff | 101/375 |
| 6,422,382 | B1 | * | 7/2002 | Ertel et al. | 198/860.1 |

(Continued)

FOREIGN PATENT DOCUMENTS

| CN | 2606093 Y | 3/2004 |
| DE | 3840951 A1 | 2/1990 |

OTHER PUBLICATIONS

International Search Report issued for PCT application No. PCT/CN2012/082759 by the State Intellectual Property Office of China.

*Primary Examiner* — Douglas Hess

(57) ABSTRACT

The present disclosure provides a roller and a conveying device. The roller includes an inner circle, an outer circle, and an inflatable cushion arranged between the inner circle and the outer circle with the volume thereof changing as air charge inflated thereinto changes. by adjusting the air charge of the inflatable cushion, the outer diameter of the roller is increased as the air charge inflated into the inflatable cushion increases, at the same time, the conveyor surrounding the exterior of the roller is tightened to increase the tension degree of the conveyor without disassembling other mechanisms of the conveying device, which is simply operated to be capable of saving labors and time.

8 Claims, 2 Drawing Sheets

(56) References Cited

U.S. PATENT DOCUMENTS

| | | | |
|---|---|---|---|
| 6,823,787 B1 * | 11/2004 | Saueressig | 101/376 |
| 6,905,119 B2 * | 6/2005 | Guddanti et al. | 271/109 |
| 7,252,261 B2 * | 8/2007 | Rollins et al. | 242/571.1 |
| 7,481,391 B2 * | 1/2009 | Kuo | 242/571.1 |
| 7,530,938 B2 * | 5/2009 | Long | 493/388 |
| 7,717,039 B2 * | 5/2010 | Becker et al. | 101/407.1 |

\* cited by examiner

ROLLER AND CONVEYING DEVICE WITH THE SAME

BACKGROUND

1. Technical Field

The present disclosure relates to technologies of conveying systems, and particularly, to a roller and a conveying device with the same.

2. Description of Related Art

Generally, a conveying device includes a conveyor and at least one roller. During the conveying process, due to the aging of the conveyor and impurities which enters into the space under the conveyor, the rotating friction of the conveyor increases, causing the conveyor to slow down. Additionally, the conveyor naturally slows down after being in use for a period of time. When the conveyor slows down, if the objects needed to be conveyed are light or the friction on the surface of the conveyor is relatively low, the objects needed to be conveyed cannot be successfully conveyed, which may result in the idling of the roller. That is, even the motor is at work, the conveyor cannot be driven to move by the motor. At this time, a tension degree of the conveyor needs to be adjusted. Furthermore, in practical use, since the objects conveyed by the conveying device are different, the tension degree of the conveyor needs to be adjusted to meet different requirements. In present technology, the tension degree of the conveyor is adjusted by increasing the distance between two rollers. That is, moving one or both of the rollers to adjust the tension degree of the conveyor. However, before moving the rollers, other related mechanisms of the conveying device are required to be disassembled or a mechanism for controlling the rollers to move are required to be configured on the conveying device, which complicates the structure of the conveying device and lowering the efficiency of adjusting the tension degree of the conveyor.

SUMMARY

An object of the present disclosure is to provide a roller allowing for convenient adjustment of a conveyor and a conveying device with the roller.

The present disclosure provides a roller. The roller includes an inner circle, an outer circle; and an inflatable cushion arranged between the inner circle and the outer circle, and a volume of the inflatable cushion changing as air charge inflated thereinto changes.

Preferably, the inner circle is made of rigid metal and the outer circle is made of flexible hard rubber, the inflatable cushion is a soft and sealed sleeve surrounding an exterior of the inner circle, and the outer circle surrounds an exterior of the inflatable cushion.

Preferably, an outer diameter of the roller increases as the air change inflated into the inflatable cushion increases, and after the inflatable cushion is fully inflated, the outer diameter of the roller is equal to a diameter of the outer circle at maximum deformation.

Preferably, the inflatable cushion is provided with an air nozzle allowing the inflatable cushion to be inflated.

The present disclosure further provides a conveying device having a roller. The roller includes an inner circle, an outer circle; and an inflatable cushion configured between the inner circle and the outer circle and a volume of the inflatable cushion changing as air charge inflated thereinto changes.

Preferably, an outer diameter of the roller increases as the air charged inflated into the inflatable cushion increases, and after the inflatable cushion is fully inflated, the outer diameter of the roller is equal to a diameter of the outer circle at maximum deformation.

Preferably, an air nozzle is configured on the inflatable cushion allowing the inflatable cushion to be inflated.

Preferably, the conveying device further includes a conveyor surrounding an exterior of the outer circle.

Preferably, the conveying device further includes a motor having a transporting mechanism connected to the roller to drive the roller to rotate, and the roller drives the conveyor to move when rotating.

The present disclosure further provides another conveying device having a roller. The roller includes an inner circle being made of rigid metal, an outer circle being made of flexible hard rubber, and an inflatable cushion arranged between the inner circle and the outer circle with a volume thereof being changed as air charge inflated thereinto changes, the inflatable cushion being a soft and sealed sleeve surrounding an exterior of the inner circle, and the inflatable cushion being surrounded by the inflatable cushion.

Preferably, an outer diameter of the roller increases as the air charge inflated into the inflatable cushion increases, and after the inflatable cushion is fully inflated, the outer diameter of the roller is equal to a diameter of the outer circle at the maximum deformation.

Preferably, the inflatable cushion is provided with an air nozzle allowing the inflatable cushion to be inflated.

Preferably, the conveying device further includes a conveyor surrounding an exterior of the outer circle.

Preferably, the conveying device further includes a motor, a transporting mechanism of the motor is connected to the roller for driving the roller to rotate, and the roller drives the conveyor to move when rotating.

By adjusting the air charge of the inflatable cushion, the outer diameter of the roller increases as the air charge inflated into the inflatable cushion increases; at the same time, the conveyor surrounding the exterior of the roller is tightened to increase the tension degree of the conveyor without disassembling other mechanisms of the conveying device, which is simply operated to be capable of saving labors and time.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
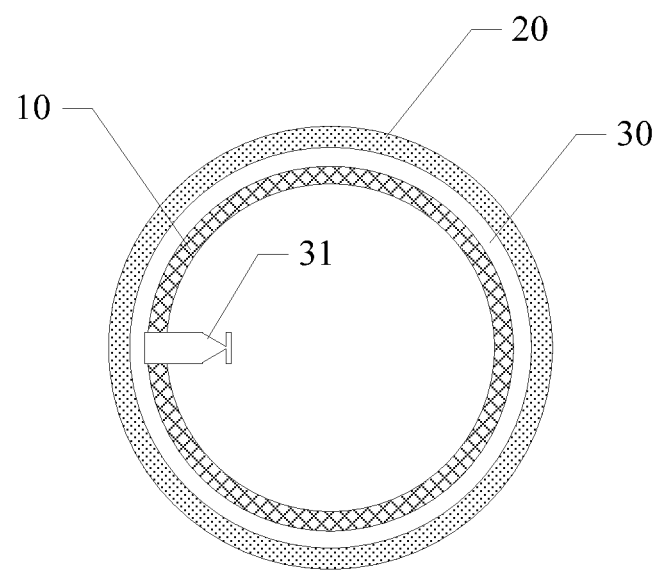
FIG. 1(a) is a schematic view of a roller before an inflatable cushion is inflated in accordance with an embodiment of the present disclosure.
FIG. 1(b) is a schematic view of the roller after the inflatable cushion is inflated.
Figure 1:
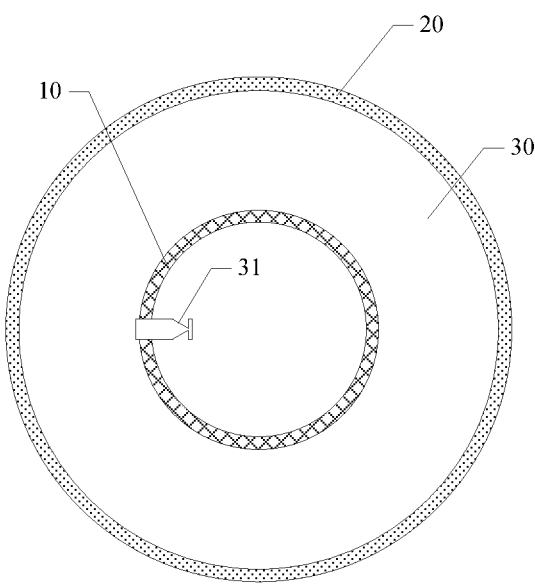

Referring to FIGS. 1(a) and 1(b), in which FIG. 1(a) is a schematic view of a roller before an inflatable cushion is inflated and FIG. 1(b) is a schematic view of the roller after the inflatable cushion is inflated. The roller in the embodiment includes an inner circle 10, an outer circle 20, and an inflatable cushion 30 arranged between the inner circle 10 and the outer circle 20. The shape of the outer circle 20 is changed by inflating the inflatable cushion 30, which also changes an outer diameter of the roller. That is, the outer diameter of the roller increases as air charge inflated into the inflatable cushion 30 increases.

The inner circle 10 is made of rigid metal such as icon, which can prevent the inner circle 10 from being pierced by hard objects or impurities. The outer circle 20 is made of flexible hard rubber, which can prevent the outer circle 20 from being pierced by hard objects or impurities. The outer circle 20 is flexible and is elastically deformed as the air charge inflated into the inflatable cushion 30 changes. The inflatable cushion 30 is a soft and sealed sleeve surrounding an exterior of the inner circle 10. The outer circle 20 surrounds an exterior of the inflatable cushion 30. The inflatable cushion 30 is provided with an air nozzle 31 which allows the inflatable cushion 30 to be inflated to change the volume of the inflatable cushion 30. Before the inflatable cushion 30 is inflated, the inflatable cushion 30 contacts an exterior of the inner circle 10 and the outer circle 20 contacts the exterior of the inflatable cushion 30. When the inflatable cushion 30 is being inflated, the volume of the inflatable cushion 30 is increased to expand the outer circle 20, allowing the outer diameter of the inflatable cushion 30 to increase as the air charge in the inflatable cushion 30 increases. After the inflatable cushion 30 is fully inflated, the inflatable cushion 30 is at maximum deformation. At the same time, the outer diameter of the roller is equal to the diameter of the outer circle at maximum deformation. By adjusting the air charge inflated into the inflatable cushion 30, the outer diameter of the roller can increase as the air charge inflated into the inflatable cushion 30 increases, thereby adjusting the outer diameter of the roller.

Figure 2:
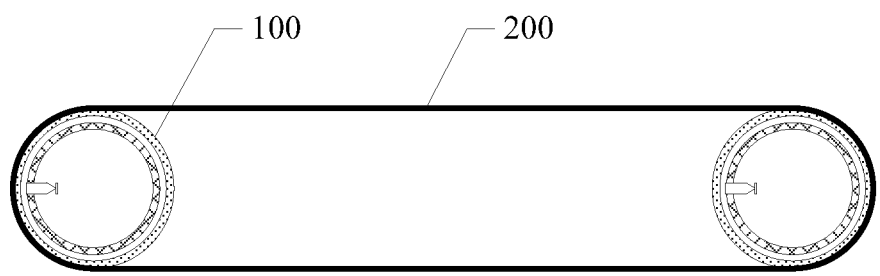
FIG. 2(a) is a schematic view of a conveying device before the inflatable cushion is inflated.
FIG. 2(b) is a schematic view of the conveying device after the inflatable cushion is inflated.
Figure 2:
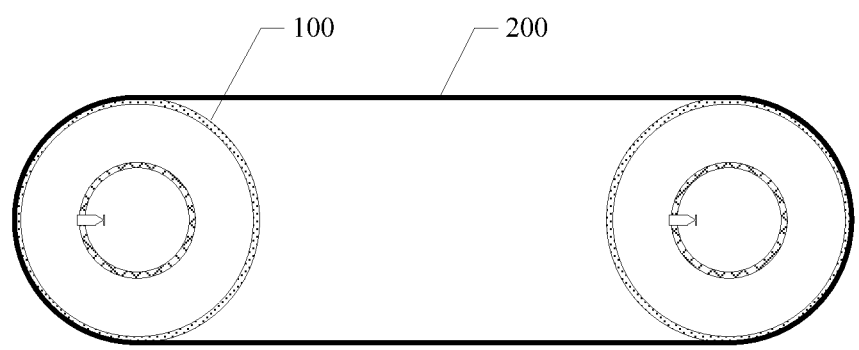

Referring to FIGS. 2(a) and 2(b), in which FIG. 2(a) is a schematic view of a conveying device before the inflatable cushion is inflated and FIG. 2(b) is a schematic view of the conveying device after the inflatable cushion is inflated. The conveying device in the embodiment includes two rollers 100, a conveyor 200, and a motor (not shown). Each of the rollers 100 includes an inner circle, an outer circle, and an inflatable cushion configured between the inner circle and the outer circle. The conveyor 200 surrounds the exterior of the outer circle. A transporting mechanism of the motor is connected to the rollers 100 to respectively drive the rollers 100 to rotate, which can further drive the conveyor 200 to move.

The rollers 100 of the conveying device can be configured according to the embodiment shown in FIGS. 1(a) and 1(b), and the structure of the conveying device can be referred to the embodiment mentioned above and is not given in detail here. With the rollers 100 of the embodiment, compared to the present conveying device, the outer diameter of the roller 100 of the conveying device of the present disclosure can be adjusted by adjusting the air charge inflated into the inflatable cushion. When the inflatable cushion is being inflated, the outer circle is expanded by the inflatable cushion and the outer diameter of the roller 100 increases as the air charge inflated into the inflatable cushion increases; at the same time, the conveyor 200 surrounding the exterior of the roller 100 is tightened to increase the tension degree of the conveyor 200 without disassembling other mechanisms of the conveying device, which is simply operated to be capable of saving labors and time.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A conveying device having a roller, the roller comprising:
    an inner circle;
    an outer circle; and
    an inflatable cushion configured between the inner circle and the outer circle and a volume of the inflatable cushion changing as air charge inflated thereinto changes;
    further comprising a conveyor surrounding an exterior of the outer circle.

2. The conveying device as claimed in claim 1, wherein an outer diameter of the roller increases as the air charged inflated into the inflatable cushion increases, and after the inflatable cushion is fully inflated, the outer diameter of the roller is equal to a diameter of the outer circle at maximum deformation.

3. The conveying device as claimed in claim 2, wherein an air nozzle is configured on the inflatable cushion allowing the inflatable cushion to be inflated.

4. The conveying device as claimed in claim 1 further comprising a motor having a transporting mechanism connected to the roller to drive the roller to rotate, and the roller drives the conveyor to move when rotating.

5. A conveying device having a roller, the roller comprising:
    an inner circle being made of rigid metal;
    an outer circle being made of flexible hard rubber; and
    an inflatable cushion arranged between the inner circle and the outer circle with a volume thereof being changed as air charge inflated thereinto changes, the inflatable cushion being a soft and sealed sleeve surrounding an exterior of the inner circle, and the inflatable cushion being surrounded by the outer circle;
    further comprising a conveyor surrounding an exterior of the outer circle.

6. The conveying device as claimed in claim 5, wherein an outer diameter of the roller increases as the air charge inflated into the inflatable cushion increases, and after the inflatable cushion is fully inflated, the outer diameter of the roller is equal to a diameter of the outer circle at the maximum deformation.

7. The conveying device as claimed in claim 6, wherein the inflatable cushion is provided with an air nozzle allowing the inflatable cushion to be inflated.

8. The conveying device as claimed in claim 5 further comprising a motor, a transporting mechanism of the motor is connected to the roller for driving the roller to rotate, and the roller drives the conveyor to move when rotating.

* * * * *